United States Patent
Liu et al.

(10) Patent No.: US 10,848,349 B2
(45) Date of Patent: Nov. 24, 2020

(54) METHOD, APPARATUS AND SYSTEM FOR REPORTING CHANNEL INFORMATION DESCRIBING AN UNQUANTIZED PRECODING MATRIX

(71) Applicant: HUAWEI TECHNOLOGIES CO., LTD., Guangdong (CN)

(72) Inventors: Kunpeng Liu, Beijing (CN); Yongxing Zhou, Beijing (CN); Di Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 83 days.

(21) Appl. No.: 16/131,533

(22) Filed: Sep. 14, 2018

(65) Prior Publication Data
US 2019/0013971 A1 Jan. 10, 2019

Related U.S. Application Data

(63) Continuation of application No. PCT/CN2017/076627, filed on Mar. 14, 2017.

(30) Foreign Application Priority Data

Mar. 16, 2016 (CN) .......................... 2016 1 0149514

(51) Int. Cl.
*H04L 25/02* (2006.01)
*H04W 24/10* (2009.01)
(Continued)

(52) U.S. Cl.
CPC ....... *H04L 25/0224* (2013.01); *H04B 7/0486* (2013.01); *H04L 5/0048* (2013.01); *H04W 24/10* (2013.01)

(58) Field of Classification Search
CPC . H04L 25/0224; H04L 5/0048; H04L 1/0026; H04B 7/0486; H04B 7/0456; H04W 24/10
See application file for complete search history.

(56) References Cited

U.S. PATENT DOCUMENTS 9,042,476 B2 * 5/2015 Krishnamurthy .... H04B 7/0456
375/267
9,667,378 B2 * 5/2017 Jongren ............... H04B 7/0634
(Continued)

FOREIGN PATENT DOCUMENTS

CN 101166047 A 4/2008
CN 101282564 A 10/2008
(Continued)

OTHER PUBLICATIONS

R1-162595, Huawei, HiSilicon, "Discussion on analog CSI feedback," 3GPP TSG RAN WG1 Meeting #84bis, Busan, Korea, Apr. 11-15, 2016 (7 pp.).
(Continued)

*Primary Examiner* — Ian N Moore
*Assistant Examiner* — Rushil Parimal Sampat

(57) ABSTRACT

A channel information reporting method and apparatus and a system are used to improve adaptive performance of a link. A first device includes: a receiving module, configured to receive a reference signal from a second device; a processing module, configured to: perform channel estimation based on the reference signal to obtain a channel matrix, decompose the channel matrix to obtain an unquantized precoding matrix, and generate channel information used to describe the unquantized precoding matrix; and a sending module, configured to send the channel information used to describe the unquantized precoding matrix to the second device. The second device sends the channel information used to describe the unquantized precoding matrix. There-
(Continued)

fore, a quantization error is avoided, so that a precoding matrix obtained by the first device is more accurate, thereby effectively improving the adaptive performance of the link.

16 Claims, 8 Drawing Sheets

(51) Int. Cl.
*H04B 7/0456* (2017.01)
*H04L 5/00* (2006.01)

(56) References Cited

U.S. PATENT DOCUMENTS

| | | | |
|---|---|---|---|
| 9,955,411 B2* | 4/2018 | Baldemair | H04W 8/005 |
| 10,447,355 B2* | 10/2019 | Qian | H04B 7/04 |
| 2005/0190850 A1 | 9/2005 | Takano | |
| 2010/0046658 A1 | 2/2010 | Yosoku et al. | |
| 2012/0214500 A1 | 8/2012 | Lv et al. | |
| 2012/0314676 A1 | 12/2012 | Koo et al. | |
| 2013/0044581 A1 | 2/2013 | Cho et al. | |
| 2013/0242896 A1 | 9/2013 | Son et al. | |
| 2013/0308715 A1 | 11/2013 | Nam et al. | |
| 2016/0066348 A1 | 3/2016 | Imamura et al. | |
| 2016/0226647 A1* | 8/2016 | Wang | H04L 1/0003 |
| 2018/0076943 A1 | 3/2018 | Clerckx et al. | |
| 2019/0149188 A1 | 5/2019 | Nakao et al. | |

FOREIGN PATENT DOCUMENTS

| | | |
|---|---|---|
| CN | 103125083 A | 5/2013 |
| CN | 104396153 A | 3/2015 |
| JP | 2005236481 A | 9/2005 |
| JP | 2008199599 A | 8/2008 |
| JP | 2010536230 A | 11/2010 |
| JP | 2011045145 A | 3/2011 |
| WO | 2008152819 A1 | 12/2008 |
| WO | 2009131376 A2 | 10/2009 |
| WO | 2010002201 A2 | 1/2010 |
| WO | 2010102583 A1 | 9/2010 |
| WO | 2011054143 A1 | 5/2011 |
| WO | 2016026350 A1 | 2/2016 |

OTHER PUBLICATIONS

R1-1611676, Huawei, HiSilicon, "Design for Type II Feedback," 3GPP TSG RAN WG1 Meeting #87, Reno, USA, Nov. 14-18, 2016 (8 pp.).

International Search Report, dated May 31, 2017, in International Application No. PCT/CN2017/076627 (4 pp.).

Written Opinion of the International Searching Authority, dated May 31, 2017, in International Application No. PCT/CN2017/076627 (9 pp.).

Extended European Search Report, dated Nov. 16, 2018, in European Application No. 17765824.2 (15 pp.).

International Search Report, dated May 31, 2017, in International Application No. PCT/CN2017/076627 (6 pp.).

Yuichi Kakishima et al., "System Level Evaluation on Enhanced 4-Tx Codebook for LTE-Advanced Downlink Multi-User MIMO", IEICE Technical Report vol. 113 No. 385, Japan, The Institute of Electronics, Information and Communication Engineers, Jan. 16, 2014, vol. 113, pp. 71-76.

Shiro Terashima et al., "Linear Space Representation of N-gram Probability Using SVD of N-gram Matrix", IEICE Transactions (J83-D-II) No. 11, Japan, The Institute of Electronics, Information and Communication Engineers, Nov. 25, 2000, vol. J83-D-II, 10 pages.

* cited by examiner

METHOD, APPARATUS AND SYSTEM FOR REPORTING CHANNEL INFORMATION DESCRIBING AN UNQUANTIZED PRECODING MATRIX

CROSS-REFERENCE TO RELATED APPLICATIONS

This application is a continuation of International Application No. PCT/CN2017/076627, filed on Mar. 14, 2017, which claims priority to Chinese Patent Application No. 201610149514.2, filed on Mar. 16, 2016. The disclosures of the aforementioned applications are hereby incorporated by reference in their entireties.

TECHNICAL FIELD

This application relates to wireless communications technologies, and in particular, to a channel information reporting method and apparatus, and a system.

BACKGROUND

Currently, in a frequency division duplex (Frequency Division Duplex, FDD) system in Long Term Evolution (Long Term Evolution, LTE), user equipment (User Equipment, UE) performs channel estimation based on a received reference signal sent by a base station, then determines channel state information, and feeds back the channel state information. The channel state information includes a rank indicator (Rank Indicator, RI), a precoding matrix index (Precoding Matrix Indicator, PMI), and a channel quality indicator (Channel Quality Indicator, CQI).

The PMI is an index of a precoding matrix, and the precoding matrix is a quantized matrix used to represent a channel feature. Therefore, a quantization loss exists, channel information that is fed back has an error, and consequently adaptive performance of a downlink is degraded.

SUMMARY

Embodiments of the present invention provide a channel information reporting method and apparatus, and a system, to resolve a problem that adaptive performance of a downlink is degraded due to a quantization loss existing when UE reports a PMI.

According to a first aspect, an embodiment of the present invention provides a channel information reporting method.

In the method, a second device sends a reference signal to a first device. The first device performs channel estimation based on the reference signal received from the second device to obtain a channel matrix. The first device decomposes the channel matrix to obtain an unquantized precoding matrix, and generates channel information used to describe the unquantized precoding matrix. The first device sends the channel information used to describe the unquantized precoding matrix to the second device. The second device receives the channel information used to describe the unquantized precoding matrix from the first device. The second device generates a precoding matrix based on the channel information used to describe the unquantized precoding matrix. The second device sends data to the first device based on the generated precoding matrix.

The first device sends the channel information used to describe the unquantized precoding matrix. Therefore, a quantization error is avoided, so that the precoding matrix obtained by the second device is more accurate, thereby effectively improving adaptive performance of a link.

In an optional implementation, the first device may decompose the channel matrix to obtain the unquantized precoding matrix. For example:

The first device performs singular value decomposition SVD on the channel matrix to obtain, after the decomposition, a diagonal matrix and a matrix consisting of an eigenvector of the channel matrix. The first device determines a rank of the channel matrix based on the diagonal matrix. The first device transforms, based on the rank of the downlink channel matrix, the matrix consisting of the eigenvector of the channel matrix to obtain the unquantized precoding matrix. A quantity of columns of the unquantized precoding matrix is equal to the rank of the channel matrix.

A method for generating the unquantized precoding matrix is provided herein.

In an optional implementation, after the unquantized precoding matrix is generated, and when the channel information used to describe the unquantized precoding matrix is generated, there may be many methods. For example:

First Method:

Amplitude information and phase information of each element in the unquantized precoding matrix is used as the channel information used to describe the unquantized precoding matrix.

In this way, after receiving the amplitude information and the phase information, the second device may generate the unquantized precoding matrix based on the information.

When sending the amplitude information and the phase information to the second device, the first device may add each of the amplitude information and the phase information to a ZC sequence, and send the ZC sequence to the second device. The second device obtains the amplitude information and the phase information from received ZC sequences.

The ZC sequence has a relatively good autocorrelation characteristic and cross-correlation characteristic. Therefore, when obtaining the channel information from the ZC sequences, the second device may obtain relatively good signal demodulation performance, thereby improving accuracy of obtaining the channel information.

When sending the amplitude information and the phase information, the first device may alternately add the amplitude information and the phase information to ZC sequences, and send the ZC sequences to the second device.

Alternatively, the first device first adds the amplitude information of each element in the unquantized precoding matrix to a ZC sequence and sends the ZC sequence to the second device, and then adds the phase information of each element to a ZC sequence and subsequently sends the ZC sequence to the second device. The second device first receives the amplitude information, and then receives the phase information.

Alternatively, the first device first adds the phase information of each element in the unquantized precoding matrix to a ZC sequence and sends the ZC sequence to the second device, and then adds the amplitude information of each element to a ZC sequence and subsequently sends the ZC sequence to the second device. The second device first receives the phase information, and then receives the amplitude information.

Optional implementations of sending the amplitude information and the phase information are provided.

Optionally, when sending the amplitude information, the first device may perform code division on amplitude information of a plurality of elements in the unquantized precoding matrix, add the amplitude information to ZC sequences, and send the ZC sequences to the second device. After receiving the ZC sequences, and when obtaining the amplitude information from the ZC sequences, the second device obtains the amplitude information after performing processing related to code division.

In this way, an amplitude value after amplitude information having a same phase is added may be prevented from being excessively large.

Second Method:

The first device represents the unquantized precoding matrix as a plurality of multiplied decomposed matrices by using a Givens decomposition manner. An amplitude value of each element in each decomposed matrix is 1. The first device uses phase information of each element in each of the plurality of decomposed matrices as the channel information used to describe the unquantized precoding matrix.

Optionally, the first device adds the phase information of each element in each of the plurality of decomposed matrices to a ZC sequence, and sends the ZC sequence to the second device.

The second device receives the ZC sequence, obtains the phase information of each element in each of the plurality of decomposed matrices from the ZC sequence, generates the plurality of decomposed matrices based on the obtained phase information, and multiplies the generated plurality of decomposed matrices to obtain the unquantized precoding matrix.

Another method for generating the channel information used to describe the unquantized precoding matrix is provided.

Third Method:

The first device represents each column vector in the unquantized precoding matrix as a weighted sum of a plurality of basis vectors. The first device uses a weighting coefficient used when each column vector in the unquantized precoding matrix is represented as a weighted sum, as the channel information used to describe the unquantized precoding matrix.

Optionally, the first device adds, to a ZC sequence, the weighting coefficient used when each column vector in the unquantized precoding matrix is represented as a weighted sum, and sends the ZC sequence to the second device.

After receiving the ZC sequence, the second device obtains the weighting coefficient carried in the ZC sequence, generates each column vector in the unquantized precoding matrix based on the obtained weighting coefficient, and generates the unquantized precoding matrix based on each generated column vector in the unquantized precoding matrix.

The second device receives the ZC sequence carrying the weighting coefficient from the first device. The second device obtains the weighting coefficient carried in the ZC sequence.

Another method for generating the channel information used to describe the unquantized precoding matrix is provided.

Fourth Method:

The first device uses phase information of each element in the unquantized precoding matrix as the channel information used to describe the unquantized precoding matrix. The first device quantizes amplitude information of each element in the unquantized precoding matrix to generate quantized amplitude information. The first device sends the quantized amplitude information of each element in the unquantized precoding matrix to the second device.

The second device generates the precoding matrix based on the phase information of each element in the unquantized precoding matrix and the quantized amplitude information of each element in the unquantized precoding matrix.

In the fourth method, the amplitude information needs to be quantized and then transmitted, and the phase information is still transmitted based on an unquantized analog parameter. A quantity of information bits of the channel information used to describe the unquantized precoding matrix can be effectively reduced. Although a quantization error exists, the second device can still obtain a relatively precise precoding matrix by properly setting a quantizing interval.

Regardless of in the method provided in the first aspect or in the method provided in various optional implementations of the first aspect, when sending the channel information used to describe the unquantized precoding matrix, the first device may further send a demodulation reference signal used to demodulate the channel information.

The second device not only receives the channel information of the unquantized precoding matrix, but also receives the demodulation reference signal used to demodulate the channel information, and demodulates the channel information based on the demodulation reference signal.

For example, the first device sends, on the first orthogonal frequency division multiplexing OFDM symbol in each timeslot on a physical resource block pair PRB pair occupied when the channel information used to describe the unquantized precoding matrix is sent, a demodulation reference signal used to demodulate the channel information that is sent on the PRB pair and that is used to describe the unquantized precoding matrix.

For another example, the first device sends, on the fourth OFDM symbol in each timeslot on a PRB pair occupied when the channel information used to describe the unquantized precoding matrix is sent, a demodulation reference signal used to demodulate the channel information that is sent in the timeslot and that is used to describe the unquantized precoding matrix.

For another example, the first device sends, on the second OFDM symbol and the sixth OFDM symbol in each timeslot on a PRB pair occupied when the channel information used to describe the unquantized precoding matrix is sent, a demodulation reference signal used to demodulate the channel information that is sent in the timeslot and that is used to describe the unquantized precoding matrix.

A plurality of manners of sending the demodulation reference signal are provided herein.

Regardless of in the method provided in the first aspect or in the method provided in various optional implementations of the first aspect, the first device may send the channel information used to describe the unquantized precoding matrix together with a quantized channel quality indicator CQI and/or a quantized rank indicator RI to the second device in a same channel state indication CSI process.

The second device receives the quantized channel quality indicator CQI and/or the quantized rank indicator RI that is sent in the same channel state indication CSI process together with the channel information used to describe the unquantized precoding matrix.

According to a second aspect, an embodiment of the present invention provides a first device. The first device has a function of implementing operations of the first device in the foregoing method. The function may be implemented by hardware, or may be implemented by hardware executing corresponding software. The hardware or software includes one or more modules corresponding to the foregoing functions.

In an optional implementation solution, a structure of the first device includes a receiver, a processor, and a transmitter. The processor is configured to support the first base station to perform a corresponding function in the foregoing method. The receiver is configured to support the first device to receive the reference signal and data that are sent by the second device in the foregoing method. The transmitter is configured to support the first device to send the channel information to the second device. The first device may further include a memory. The memory is configured to couple to the processor and stores a program instruction and data that are necessary to the first device.

According to a third aspect, an embodiment of the present invention provides a second device. The second device has a function of implementing operations of the second device in the foregoing method. The function may be implemented by hardware, or may be implemented by hardware executing corresponding software. The hardware or software includes one or more modules corresponding to the foregoing functions.

In an optional implementation, a structure of the second device includes a receiver, a processor, and a transmitter. The transmitter is configured to support the second device to send the reference signal and data in the foregoing method to the first device. The processor is configured to support the second device to perform a corresponding function in the foregoing method. The receiver is configured to support the second device to receive the channel information sent by the first device. Optionally, the second device further includes a memory. The memory is configured to couple to the processor and stores a program instruction and data that are necessary to the second device.

According to a fourth aspect, an embodiment of the present invention provides a wireless communications system. The wireless communications system includes the first device and the second device according to any one of the first aspect to the third aspect.

According to a fifth aspect, an embodiment of the present invention provides a computer storage medium, configured to store a computer software instruction used by the first device according to any one of the first aspect to the fourth aspect. The computer software instruction includes a program designed to perform the foregoing aspect.

According to a sixth aspect, an embodiment of the present invention provides a computer storage medium, configured to store a computer software instruction used by the second device according to any one of the first aspect to the fourth aspect. The computer software instruction includes a program designed to perform the foregoing aspect.

According to a seventh aspect, an embodiment of the present invention provides a channel information reporting method, including:

sending, by a second device, a reference signal to a first device; performing, by the first device, channel estimation based on the reference signal to obtain a channel matrix, generating channel information used to describe the channel matrix, and sending the channel information used to describe the channel matrix to the second device; and receiving, by the second device, the channel information used to describe the channel matrix from the first device, generating the channel matrix based on the channel information used to describe the channel matrix, generating an unquantized precoding matrix based on the generated channel matrix, and sending data to the first device based on the generated unquantized precoding matrix.

The second device sends the channel information used to describe the channel matrix. Therefore, a quantization error when a quantized precoding matrix is sent is avoided, so that the channel information obtained by the first device is more accurate, thereby effectively improving adaptive performance of a link.

In an optional implementation, the first device represents each column vector in the channel matrix as a weighted sum of a plurality of basis vectors. The first device uses a weighting coefficient used when each column vector in the channel matrix is represented as a weighted sum, as the channel information used to describe the channel matrix.

Optionally, the first device may add, to a ZC sequence, the weighting coefficient used when each column vector in the channel matrix is represented as a weighted sum, and send the ZC sequence to the second device. The second device obtains the weighting coefficient from the received ZC sequence, and generates the channel matrix based on the obtained weighting coefficient.

In an optional implementation, the first device sends the channel information used to describe the channel matrix together with a quantized channel quality indicator CQI and/or a quantized rank indicator RI to the second device in a same channel state indication CSI process.

According to an eighth aspect, an embodiment of the present invention provides a first device. The first device has a function of implementing operations of the first device in the foregoing method. The function may be implemented by hardware, or may be implemented by hardware executing corresponding software. The hardware or software includes one or more modules corresponding to the foregoing functions.

In an optional implementation solution, a structure of the first device includes a receiver, a processor, and a transmitter. The processor is configured to support the first base station to perform a corresponding function in the foregoing method. The receiver is configured to support the first device to receive the reference signal and data that are sent by the second device in the foregoing method. The transmitter is configured to support the first device to send the channel information to the second device. The first device may further include a memory. The memory is configured to couple to the processor and stores a program instruction and data that are necessary to the first device.

According to a ninth aspect, an embodiment of the present invention provides a second device. The second device has a function of implementing operations of the second device in the foregoing method. The function may be implemented by hardware, or may be implemented by hardware executing corresponding software. The hardware or software includes one or more modules corresponding to the foregoing functions.

In an optional implementation, a structure of the second device includes a receiver, a processor, and a transmitter. The transmitter is configured to support the second device to send the reference signal and data in the foregoing method to the first device. The processor is configured to support the second device to perform a corresponding function in the foregoing method. The receiver is configured to support the second device to receive the channel information sent by the first device. Optionally, the second device further includes a memory. The memory is configured to couple to the processor and stores a program instruction and data that are necessary to the second device.

According to a tenth aspect, an embodiment of the present invention provides a wireless communications system. The wireless communications system includes the first device and the second device according to any one of the first aspect to the ninth aspect.

According to an eleventh aspect, an embodiment of the present invention provides a computer storage medium, configured to store a computer software instruction used by the first device according to any one of the first aspect to the tenth aspect. The computer software instruction includes a program designed to perform the foregoing aspect.

According to a twelfth aspect, an embodiment of the present invention provides a computer storage medium, configured to store a computer software instruction used by the second device according to any one of the first aspect to the tenth aspect. The computer software instruction includes a program designed to perform the foregoing aspect.

DESCRIPTION OF EMBODIMENTS

Figure 1:
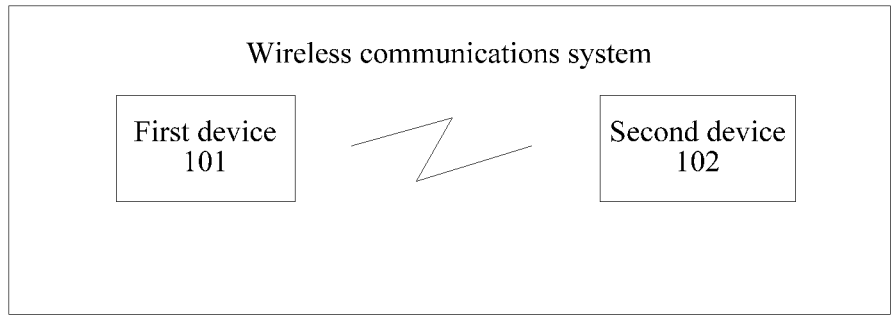
FIG. 1 is a schematic structural diagram of a wireless communications system according to an embodiment of the present invention.

To make the objectives, solutions, and advantages of the embodiments of the present invention more understandable, the following provides detailed descriptions. The detailed descriptions provide various implementations of a device and/or a method by using block diagrams, flowcharts, and/or examples. These block diagrams, flowcharts, and/or examples include one or more functions and/or operations. Persons skilled in the art may understand that each function and/or operation in the block diagrams, the flowcharts, and/or the examples can be performed independently and/or jointly by using various hardware, software, and firmware, and/or any combination thereof.

The terms "system" and "network" may be used interchangeably in the embodiments of the present invention. The term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

To make the embodiments of the present invention easier to be understood, the following first describes some descriptions in the embodiments of the present invention. These descriptions should not be considered as a limitation on the protection scope claimed in the present invention.

Channel Matrix

Assuming that in a wireless communications system, a transmitted signal is x, a received signal is y, a channel impulse response of a channel between x and y is h, and an additive Gaussian noise is n, the received signal y and the transmitted signal x satisfy the following relationship:

$$y=hx+n$$

For a multiple input multiple output (Multiple Input Multiple Output, MIMO) system including Nt transmit antennas and Nr receive antennas, a received signal y and a transmitted signal x satisfy the following relationship:

$$y=Hx+n$$

$x \in f^{Nt \times 1}$, $y \in f^{Nr \times 1}$, H is a channel matrix, $H \in f^{Nr \times Nt}$, and $n \in f^{Nr \times 1}$.

The $i^{th}$ row and $j^{th}$ column of the channel matrix H indicates a channel gain that is expressed with a complex number and that is from the $j^{th}$ transmit antenna to the $i^{th}$ receive antenna.

When Nt=1, and Nr>1, the MIMO system is a single input multiple output (Single Input Multiple Output, SIMO) system. When Nt>1, and Nr=1, the MIMO system is a multiple input single output (Multiple Input Single Output, MISO) system. Both the SIMO system and the MISO system may be considered as a particular case of the MIMO system. The embodiments of the present invention are applicable to a MIMO system.

Second: Precoding Matrix

If a transmit end of a signal obtains channel information of a channel between the transmit end and a receive end, the transmit end may preprocess a transmitted signal based on the obtained channel information. Some or all interference between data streams may be pre-eliminated on the transmit end, to implement link adaptability of data transmission, that is, different data transmission manners are used based on different channel conditions, to reduce interference between data streams as much as possible.

A matrix used when the transmit end performs precoding processing is the "precoding matrix".

A relationship between a received signal y and a transmitted signal x after the transmit end performs precoding processing may be indicated by using the following formula:

$$y = HFx + n$$

F is a precoding matrix.

Third: A Preprocessing Method During Downlink Transmission in an LTE FDD System

A base station sends a sounding reference signal to UE. The UE performs channel estimation based on the received sounding reference signal to obtain a channel matrix H, and selects a precoding matrix S from a preset codebook set C={Wi}, to maximize a capacity or a signal-to-noise ratio (Signal to Noise Ratio, SNR). The UE feeds back an index PMI of the selected precoding matrix to the base station.

For example, a codebook in which a quantity of antenna ports is 2 is shown in the following table. At present, there are only four precoding matrices whose rank is 1.

| Codebook index (Code Index) | Number of layers (Number of layers) | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\j\end{bmatrix}$ | — |

It may be learned that the precoding matrix fed back by the UE is quantized, and therefore an error exists, causing inaccurate channel information obtained by the base station and poor adaptive performance of a link.

FIG. 1 is a schematic structural diagram of a wireless communications system according to an embodiment of the present invention. As shown in FIG. 1, the wireless communications system includes a first device 101 and a second device 102.

The second device 102 sends a reference signal to the first device 101. The first device 101 performs channel estimation based on the reference signal received from the second device 102, and sends, to the second device 102, channel information used to indicate a channel estimation result. The second device 102 sends data to the first device 101 based on the received channel information.

Figure 2:
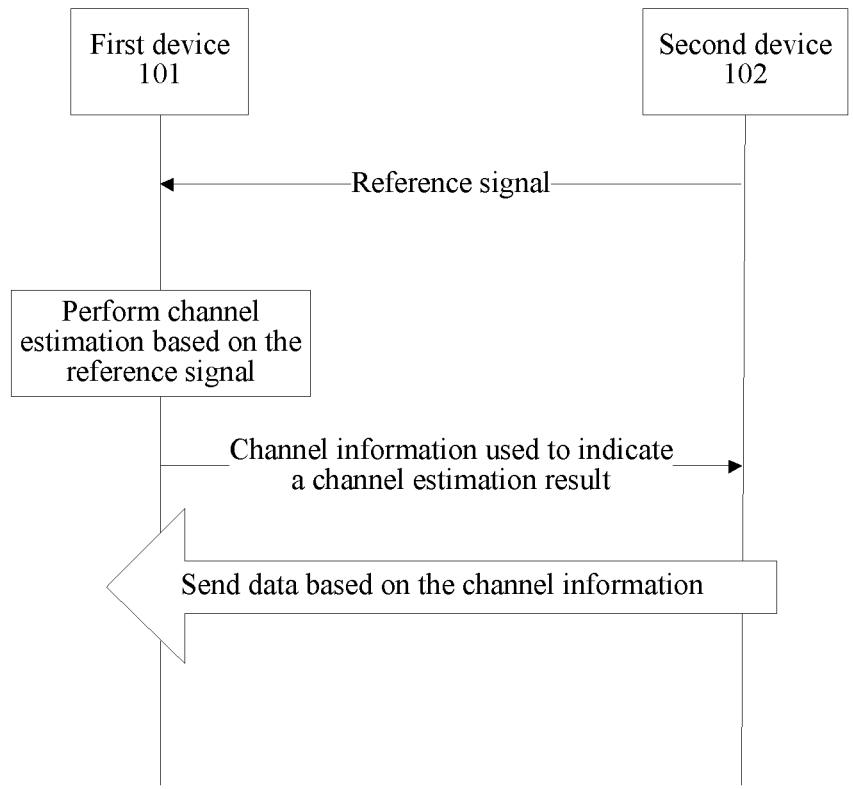
FIG. 2 is a schematic diagram of interaction between a first device and a second device according to an embodiment of the present invention.

The foregoing interaction process between the first device 101 and the second device 102 may be shown in FIG. 2.

The first device 101 may be a network device, for example, a base station. The second device 102 may be a terminal device. Alternatively, the first device 101 may be a terminal device, and the second device 102 may be a network device. Further alternatively, the first device 101 and the second device 102 are both terminal devices. Further alternatively, the first device 101 and the second device 102 are both network devices.

Channel information reporting and data transmission can be performed by using the solution provided in this embodiment of the present invention to obtain a more accurate channel estimation result and improve adaptive performance of a link, provided that the second device 102 sends the reference signal to the first device 101 and the first device 101 performs channel estimation based on a reference signal and feeds back channel information.

In addition, regardless of which duplexing manner, for example, the foregoing FDD duplexing manner or a time division duplexing (Time Division Duplexing, TDD) manner, is used during communication between the first device 101 and the second device 102, the solution provided in this embodiment of the present invention can be used to obtain an accurate channel estimation result and improve the adaptive performance of the link.

A communications standard of communication between the first device 101 and the second device 102 may include, but is not limited to, Global System for Mobile Communications (Global System of Mobile communication, GSM), Code Division Multiple Access (Code Division Multiple Access, CDMA) IS-95, Code Division Multiple Access (Code Division Multiple Access, CDMA) 2000, Time Division-Synchronous Code Division Multiple Access (Time Division-Synchronous Code Division Multiple Access, TD-SCDMA), Wideband Code Division Multiple Access (Wideband Code Division Multiple Access, WCDMA), Time Division Duplexing-Long Term Evolution (Time Division Duplexing-Long Term Evolution, TDD LTE), Frequency Division Duplexing-Long Term Evolution (Frequency Division Duplexing-Long Term Evolution, FDD LTE), Long Term Evolution-Advanced (Long Term Evolution-Advanced, LTE-Advanced), a personal handy-phone system (Personal Handy-phone System, PHS), Wireless Fidelity (Wireless Fidelity, WiFi) stipulated in the 802.11 series protocol, Worldwide Interoperability for Microwave Access (Worldwide Interoperability for Microwave Access, WiMAX), and various future-evolved wireless communications systems.

The foregoing terminal device may be a wireless terminal. The wireless terminal may be a device for providing voice and/or data connectivity to a user, a handheld device having a wireless connection function, or another processing device connected to a wireless modem. The wireless terminal may communicate with one or more core networks through a radio access network (for example, RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The foregoing network device may include a base station or a radio resource management device configured to control a base station, or may include a base station and a radio resource management device configured to control the base station. The base station may be a macro base station or a micro base station, for example, a small cell (small cell) or a pico cell (pico cell). Alternatively, the base station may be a home base station, for example, a home NodeB (Home NodeB, HNB) or a home evolved NodeB (Home eNodeB, HeNB). The base station may include a relay (relay) node and the like.

For example, for an LTE system such as a TDD LTE system, an FDD LTE system, or an LTE-A system, the foregoing network device may be an evolved NodeB (evolved NodeB, eNodeB), and the terminal device may be UE. For a TD-SCDMA system or a WCDMA system, the foregoing network device may include a NodeB (NodeB) and/or a radio network controller (Radio Network Controller, RNC), and the terminal device may be UE. For a GSM system, the foregoing network device may include a base transceiver station (Base Transceiver Station, BTS) and/or a base station controller (Base Station Controller, BSC), and the terminal device may be a mobile station (Mobile Station, MS). For a WiFi system, the foregoing network device may include an access point (Access Point, AP) and/or an access controller (Access Controller, AC), and the terminal device may be a station (Station, STA).

Figure 3:
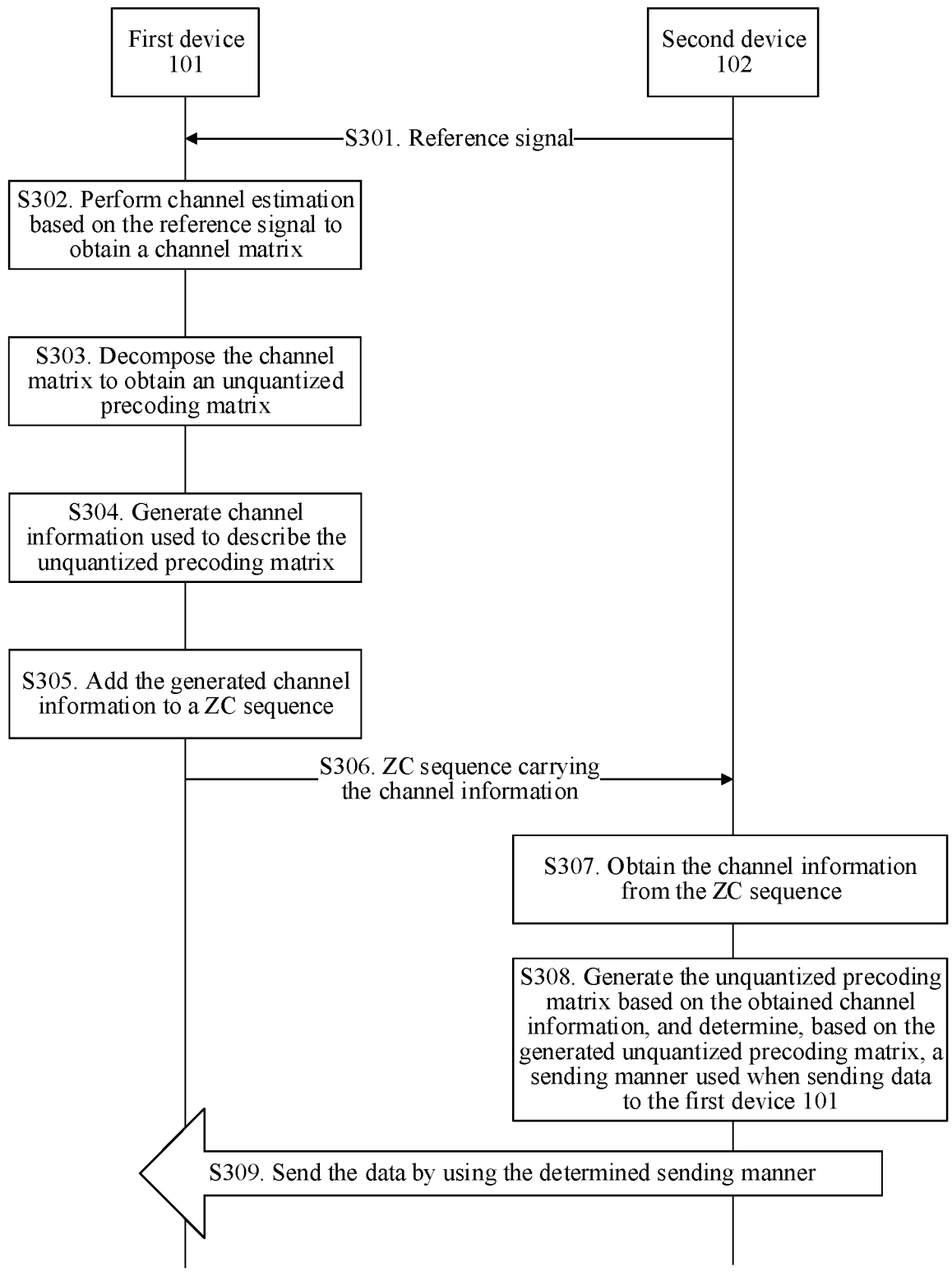
FIG. 3 is a flowchart of a first channel information reporting solution according to an embodiment of the present invention.
Figure 7:
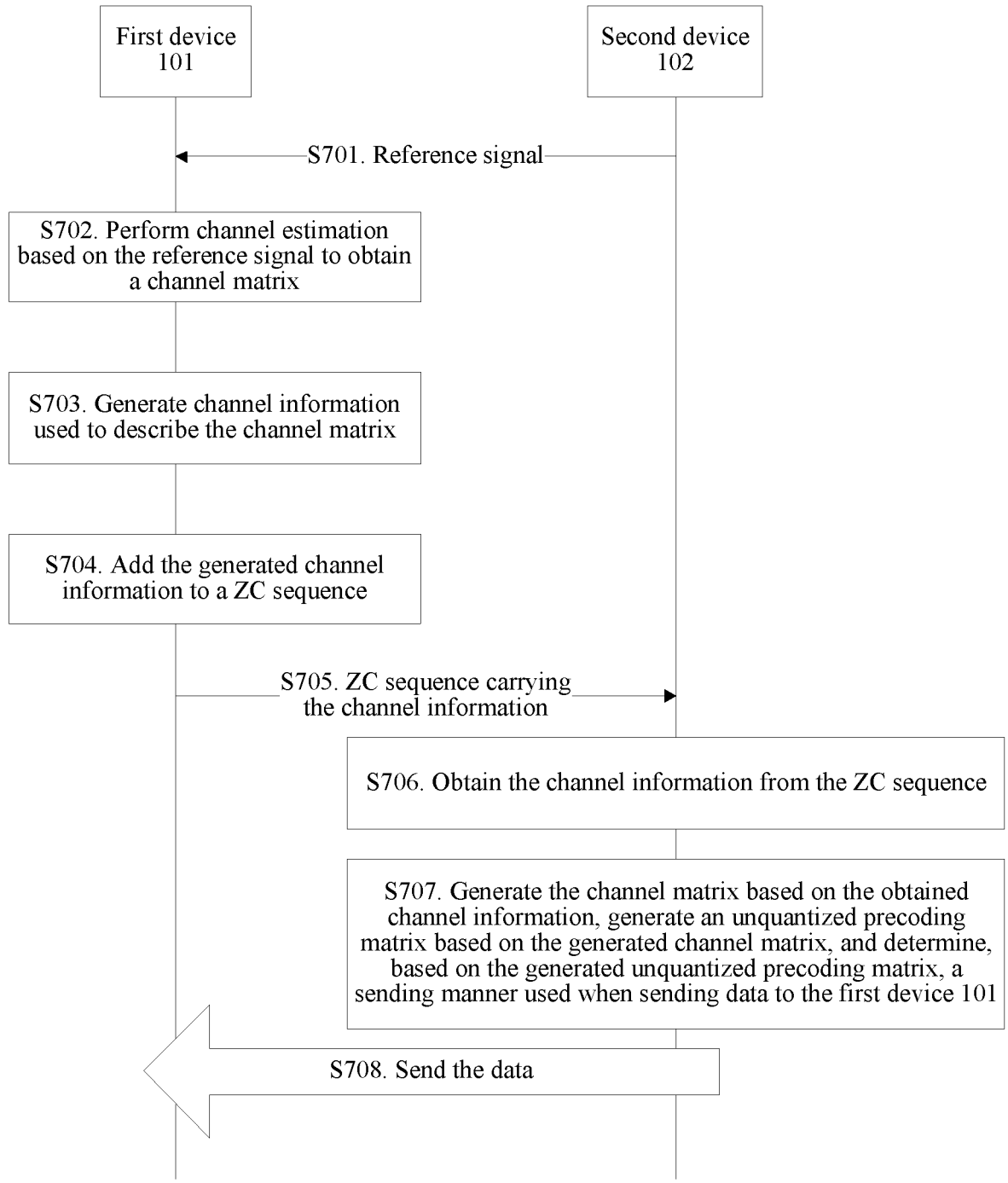
FIG. 7 is a flowchart of a second channel information reporting solution according to an embodiment of the present invention.

The following FIG. 3 and FIG. 7 separately show two channel information reporting solutions.

In a solution shown in FIG. 3, a first device 101 reports channel information used to describe the unquantized precoding matrix.

In a solution shown in FIG. 7, a first device 101 reports channel information of a channel matrix.

The following separately describes the two solutions shown in FIG. 3 and FIG. 7.

FIG. 3 shows a procedure of a first channel information reporting solution according to an embodiment of the present invention. As shown in FIG. 3, the procedure includes the following steps.

S301: A second device 102 sends a reference signal to a first device 101, where the reference signal is used to perform channel estimation on a channel from the second device 102 to the first device 101.

Optionally, when the second device 102 is a base station in an LTE system and the first device 101 is user equipment in the LTE system, the reference signal may be a demodulation reference signal (Demodulation Reference Signal, DMRS).

S302: The first device 101 performs channel estimation based on the reference signal to obtain a channel matrix H.

S303: The first device 101 decomposes the channel matrix H to obtain an unquantized precoding matrix.

There may be a plurality of decomposition methods, for example, singular value decomposition (Singular Value Decomposition, SVD), when the first device 101 decomposes the channel matrix H. The plurality of decomposition methods may be subsequently described in detail.

S304: The first device 101 generates channel information used to describe the unquantized precoding matrix.

S305: The first device 101 adds the generated channel information used to describe the unquantized precoding matrix to a ZC sequence.

S306: The first device 101 sends the ZC sequence carrying the channel information used to describe the unquantized precoding matrix to the second device 102.

In step S305 and step S306, the first device 101 adds the generated channel information to the ZC sequence and sends the ZC sequence to the second device 102. The ZC sequence has a relatively good autocorrelation characteristic and cross-correlation characteristic. Therefore, when obtaining the channel information from the ZC sequence, the second device 102 may obtain relatively good signal demodulation performance, thereby improving accuracy of obtaining the channel information.

The ZC sequence is merely an example. The channel information used to describe the unquantized precoding matrix may also be carried in another sequence for sending, provided that the second device 102 can obtain the channel information.

A manner of adding to a sequence such as the ZC sequence is actually a sending manner on a physical layer. Actually, the channel information may also be transmitted by using Media Access Control (Medium Access Control, MAC) signaling or higher layer signaling, for example, Radio Resource Control (Radio Resource Control, RRC) signaling.

S307: The second device 102 obtains the channel information from the received ZC sequence carrying the channel information used to describe the unquantized precoding matrix.

S308: The second device 102 generates a precoding matrix based on the obtained channel information, and determines, based on the generated precoding matrix, a sending manner used when sending data to the first device 101. For a method for determining a data sending manner by the second device 102 based on the generated precoding matrix, refer to a current method for determining a data sending manner by a base station based on a quantized precoding matrix, but in this embodiment of the present invention, the second device 102 generates the precoding matrix based on some or all unquantized channel information having higher precision.

S309: The second device 102 sends the data to the first device 101 by using the determined sending manner.

In the procedure shown in FIG. 3, the second device 102 sends the channel information used to describe the unquantized precoding matrix. Therefore, a quantization error is avoided, so that the precoding matrix obtained by the first device 101 is more accurate, thereby effectively improving adaptive performance of a link.

A decomposition manner of the channel matrix H, and a generation method for and a sending manner of the channel information used to describe the unquantized precoding matrix in the procedure shown in FIG. 3 are described below in detail.

The SVD decomposition manner is used as an example herein for description.

A decomposition manner that may be used is not limited to the SVD decomposition manner, provided that the unquantized precoding matrix can be obtained from the channel matrix H.

The second device 102 may perform eigenvalue decomposition on the channel matrix H based on the following formula, to obtain an eigenvector of the channel matrix H:

$$H=U\Sigma V.$$

$\Sigma$ is a diagonal matrix, and V is a matrix including the eigenvector of the channel matrix H. A rank (Rank) and an SNR of the channel matrix H may be obtained based on $\Sigma$, and a precoding matrix B of a channel may be obtained based on V. For example, after an eigenvector corresponding to an eigenvalue less than an eigenvalue threshold is removed, a remaining eigenvector forms B. The precoding matrix is not quantized, that is, is the unquantized precoding matrix. A quantity of columns of the matrix B may be equal to the rank of the channel matrix H, and the eigenvalue threshold may be preset by the second device 102.

The following describes an optional method for generating and sending the channel information in the corresponding step S304 when the channel matrix H is decomposed by using SVD.

In a first method, the channel information used to describe the unquantized precoding matrix is amplitude information and phase information of each element in the unquantized precoding matrix B.

In a second method, the unquantized precoding matrix B is represented as a plurality of multiplied decomposed matrices by using a Givens decomposition manner, an amplitude value of each element in each decomposed matrix is 1, and the channel information used to describe the unquantized precoding matrix is phase information of each element in each of the plurality of decomposed matrices.

In a third method, each column vector in the unquantized precoding matrix B is represented as a weighted sum of a plurality of basis vectors, and the channel information used to describe the unquantized precoding matrix is a weighting coefficient used when a weighted sum operation is performed.

In a fourth method, the channel information includes phase information of each element in the unquantized precoding matrix B and quantized amplitude information of each element in the unquantized precoding matrix.

The four optional methods are separately described below.

In the first method, the channel information used to describe the unquantized precoding matrix is amplitude information and phase information of each element in the unquantized precoding matrix B.

Assuming that the rank is N, the precoding matrix is B and has N columns and M rows in total. M is a quantity of antenna ports of the first device 101.

For the matrix B, there are M*N*2 parameters in total that need to be fed back, for example, M*N pieces of amplitude information $a_{m,n}$ and M*N pieces of phase information $\Phi_{m,n}$. M, N, m, and n are positive integers, 1≤m≤M, and 1≤n≤N. The M*N*2 pieces of information are the channel information that is used to describe the unquantized precoding matrix B and that is generated in step S304.

The M*N*2 pieces of information may be modulated to signals for sending. A preset sequence, for example, a ZC sequence, is used for each signal, that is, the signal is carried in the ZC sequence for transmission.

Using an LTE system as an example, it is assumed that one physical resource block (Physical Resource Block, PRB) pair (pair) includes 14 orthogonal frequency division multiplexing (Orthogonal Frequency Division Multiplexing, OFDM) symbols, and each OFDM symbol may transmit one ZC sequence $S_i$. i is a positive integer, and 1≤i≤M*N*2. Each of the M*N*2 pieces of information is carried by using one ZC sequence, and ZC sequences corresponding to different pieces of information may be different or may be the same. Information transmission may be performed in the following manner:

If the phase information $\Phi_{m,n}$ is modulated to a ZC sequence $S_i$, one PRB pair may transmit 14 pieces of phase information (it is assumed that a demodulation reference signal is not transmitted on the PRB pair, and the demodulation reference signal is used by the first device 101 to demodulate the channel information).

If one PRB pair is insufficient to transmit the phase information needing to be transmitted, another frequency domain resource is further used for transmission. For example, a PRB pair 0 transmits 14 pieces of phase information. If the PRB pair 0 is insufficient, a PRB pair 1 continues to be used for transmission.

Figure 4A:
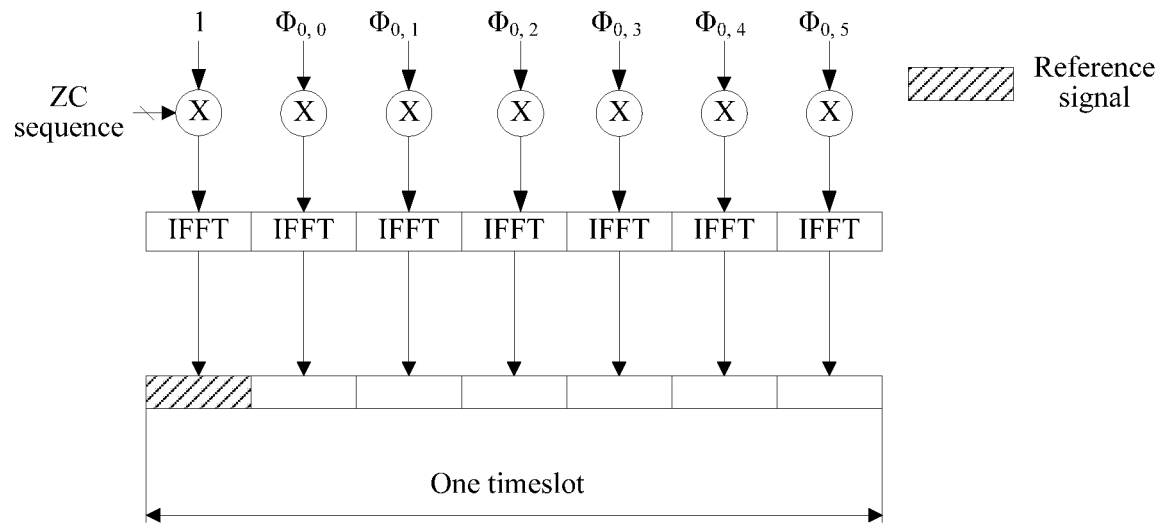
FIG. 4A to FIG. 4C show optional manners of channel information and a demodulation reference signal according to an embodiment of the present invention.

FIG. 4A shows a modulation method for modulating, when a demodulation reference signal used to demodulate the channel information is transmitted on the first OFDM symbol in each timeslot on a PRB pair, the phase information in the channel information to the PRB pair. For example, when the first device 101 is a base station and the second device 102 is a terminal device, the channel information is uplink channel information, and the demodulation reference signal is a demodulation reference signal used to demodulate the uplink channel information.

Figure 4B:
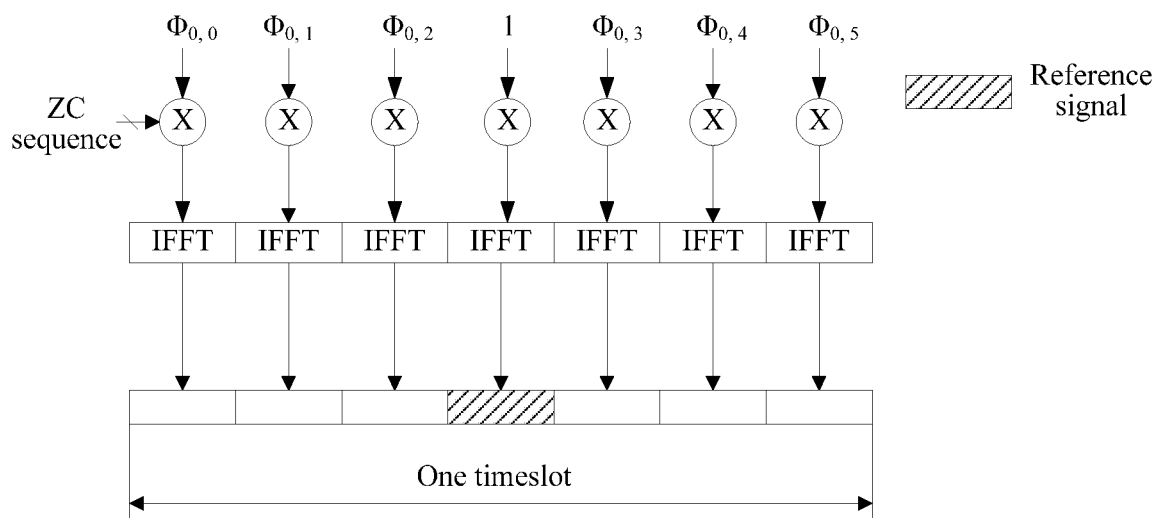

FIG. 4B shows a modulation method for modulating, when a demodulation reference signal used to demodulate the channel information is transmitted on the fourth OFDM symbol in each timeslot on a PRB pair, the phase information in the channel information to the PRB pair. For example, when the first device 101 is a base station and the second device 102 is a terminal device, the channel information is uplink channel information, and the demodulation reference signal is a demodulation reference signal used to demodulate the uplink channel information.

Figure 4C:
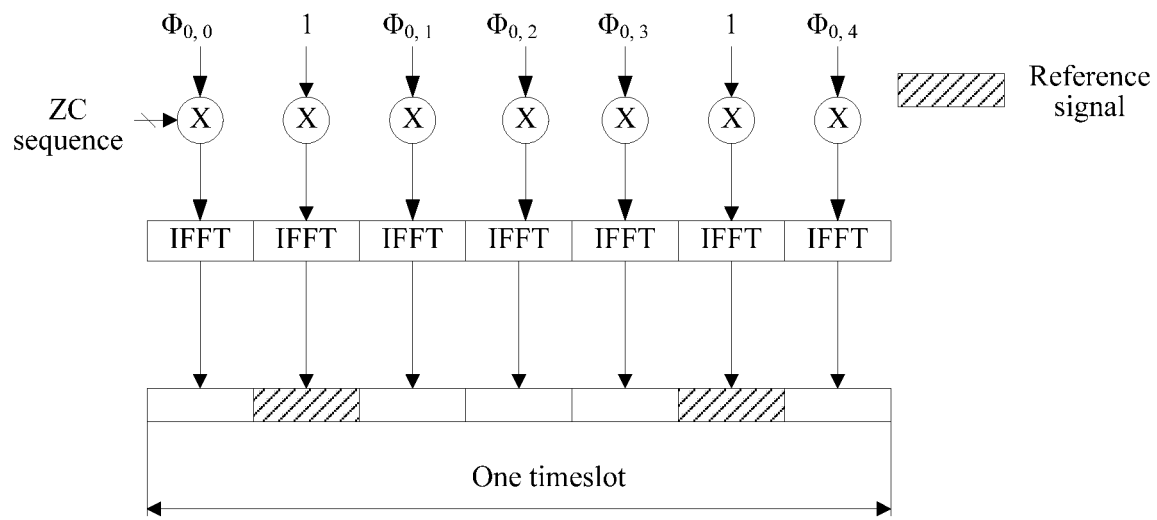

FIG. 4C shows a modulation method for modulating, when a demodulation reference signal used to demodulate the channel information is transmitted on the second OFDM symbol and the sixth OFDM symbol in each timeslot on a PRB pair, the phase information in the channel information to the PRB pair. For example, when the first device 101 is a base station and the second device 102 is a terminal device, the channel information is uplink channel information, and the demodulation reference signal is a demodulation reference signal used to demodulate the uplink channel information.

Optionally, in the modulation methods shown in FIG. 4A to FIG. 4C, the demodulation reference signal used to demodulate the channel information may also be sent only in the first timeslot or the second timeslot on a PRB pair. The demodulation reference signal used to demodulate the channel information is modulated by using 1, and another OFDM symbol is modulated by using the phase information in the channel information.

A location and quantity of OFDM symbols occupied by the demodulation reference signal used to demodulate the channel information are not limited to the methods shown in FIG. 4A to FIG. 4C. More occupied OFDM symbols indicate a more even distribution on the PRB pair and more accurate channel information obtained by the first device 101, but more occupied OFDM symbols indicate lower transmission efficiency of the channel information.

A signal that is received by the first device 101 on one OFDM symbol and that is of the phase information carried in the ZC sequence may be indicated by using the following formula:

$$y' = h'*S_i*\Phi_{m,n}.$$

h' has been solved by using the demodulation reference signal on the PRB pair, Si is an already known sequence of the first device 101, and the first device 101 may obtain $\Phi_{m,n}$ through demodulation.

Figure 5:
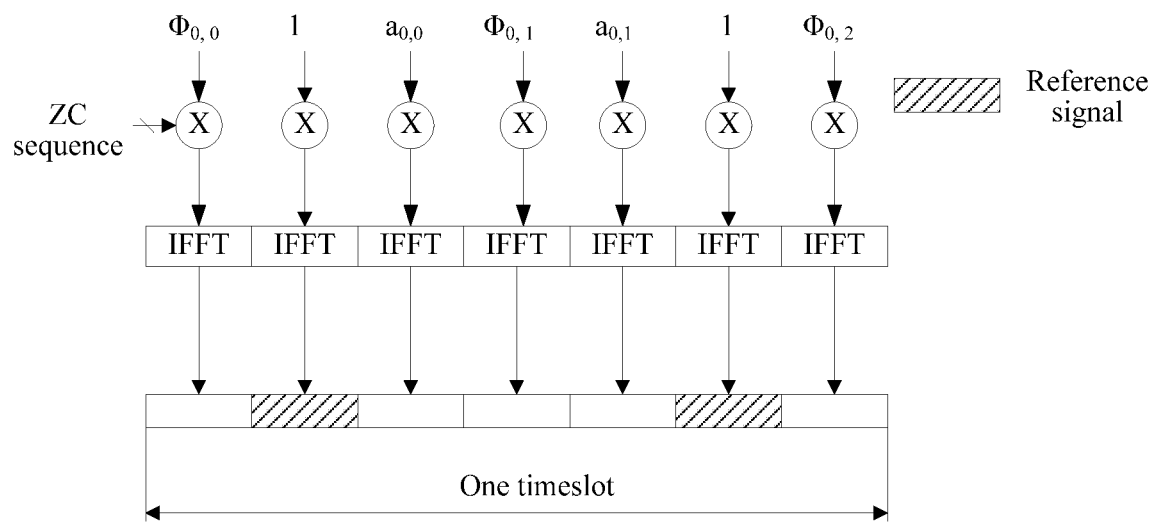
FIG. 5 is a schematic diagram of alternately sending amplitude information and phase information in channel information according to an embodiment of the present invention.

Similarly, the amplitude information also needs to be sent. The second device 102 may also modulate the amplitude information to a ZC sequence, and a modulation method for demodulating the amplitude information by the first device 101 may also be the same as a demodulation method for the phase information. For example, the amplitude information $a_{0,0}$ is carried in a ZC sequence $S_0$ to be sent, and may be sent after all the phase information in the channel information is sent, or may be sent before all the phase information is sent, or the amplitude information and the phase information in the channel information are alternately sent, as shown in FIG. 5. A location and quantity of demodulation reference signals used to demodulate the channel information may not be limited to the solution shown in FIG. 5.

Optionally, the amplitude information in the channel information may be modulated to the ZC sequence after code division. In this way, an advantage is that an amplitude value after amplitude information having a same phase is added may be prevented from being excessively large. An orthogonal sequence is used to be multiplied with the amplitude information during code division processing, and the amplitude information and the orthogonal sequence are in a one-to-one correspondence, that is, a quantity of used orthogonal sequences that are mutually orthogonal is the same as a quantity of pieces of amplitude information.

Figure 6:
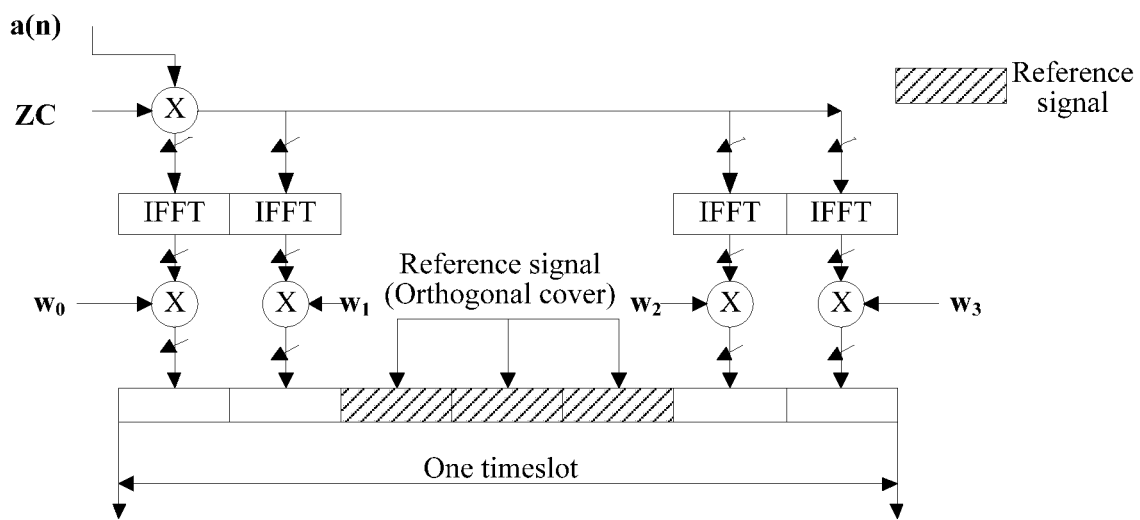
FIG. 6 is a schematic diagram of sending amplitude information after code division according to an embodiment of the present invention.

As shown in FIG. 6, there are three pieces of amplitude information needing to be sent, and three orthogonal sequences a(n) that are mutually orthogonal are required. n is an integer, and 0≤n≤3. (w0, w1, w2, w3), for example, (1, 1, 1, 1), indicates one orthogonal sequence. Orthogonal cover (orthogonal cover) indicates that if there are three reference signals, only three pieces of channel information can be transmitted. This is because three reference signals can only distinguish between three pieces of channel information.

When the first method is used, in step S308, after receiving the channel information, the second device 102 may recover the unquantized precoding matrix B by using the amplitude information and the phase information in the channel information.

A difference between the first method and the subsequently described fourth method is that, in the first method, both the amplitude information and the phase information are unquantized, but in the fourth method, the amplitude information is quantized and the phase information is unquantized. Therefore, in the first method, the second device 102 can obtain a more accurate unquantized precoding matrix, and an obtained channel estimation result is more precise. In the fourth method, because some information is quantized, precision of a precoding matrix obtained by the second device 102 is not as high as that in the first method, but is still higher than precision of a quantized precoding matrix that is obtained at present. In addition, compared with the first method, some information bits are reduced.

Second Method: Phase Information of Decomposed Matrices

The first device 101 decomposes the unquantized precoding matrix B into a plurality of multiplied decomposed matrices by using a Givens decomposition manner. An amplitude value of each element in each decomposed matrix is 1, that is, each decomposed matrix includes phase information only, and the phase information represents the unquantized precoding matrix B.

The first device 101 uses phase information of each element in each of the plurality of decomposed matrices as the channel information used to describe the unquantized precoding matrix.

The first device 101 modulates the phase information of each element in each of the plurality of decomposed matrices to a ZC sequence, and sends the ZC sequence to the second device 102. Specifically, refer to the method for sending the amplitude information and the phase information in the first method.

In step S308, after receiving the ZC sequence, the second device 102 may demodulate the ZC sequence to obtain the phase information, recover the plurality of decomposed matrices, and multiplies the plurality of recovered decomposed matrices, to obtain the unquantized precoding matrix B.

In the third method, the channel information is a weighting coefficient.

In the third method, the first device 101 uses a weighting coefficient used when each column vector in the unquantized precoding matrix B is represented as a weighted sum, as the channel information used to describe the unquantized precoding matrix B.

In the method, the first device 101 and the second device 102 need to agree upon each used basis vector in advance, for example, agree upon in advance that L basis vectors $[U_0\ U_1\ \ldots\ U_{L-1}]$ are used. L is a positive integer. The first device 101 may represent each column vector in the obtained unquantized precoding matrix B as a weighted sum of the L basis vectors:

$$\chi_0 \times U_0 + \chi_1 \times U_1 + \ldots + \chi_{L-1} \times U_{L-1}$$

A quantity of columns of the unquantized precoding matrix B is N. In this way, the channel information used to describe the unquantized precoding matrix B includes N*L weighting coefficients.

The N*L weighting coefficients may also be modulated to a ZC sequence by using the method provided in the first method. The first device 101 may also obtain the N*L weighting coefficients from the ZC sequence by using the manner provided in the first method.

Optionally, L basis vectors used when a discrete Fourier transform (Discrete Fourier Transform, DFT) linear combination manner is used may be indicated by using the following formula, and M is a quantity of rows of the matrix B:

$$DFT = [U_0\ U_1\ \ldots\ U_{L-1}] = \begin{bmatrix} 1 & 1 & \ldots & 1 \\ 1 & e^{-j\frac{2\pi}{L}} & \ldots & e^{-j\frac{2\pi}{L}(L-1)} \\ \vdots & \vdots & \ldots & \vdots \\ 1 & e^{-j\frac{2\pi}{L}(M-1)} & \ldots & e^{-j\frac{2\pi}{L}(M-1)(L-1)} \end{bmatrix}$$

L basis vectors used when a discrete cosine transform (Discrete Cosine Transform, DFT) linear combination manner is used may be indicated by using the following formula, and M is a quantity of rows of the matrix B:

$$DFT = [U_0\ U_1\ \ldots\ U_{L-1}] =$$

$$\sqrt{\frac{2}{L}} \begin{bmatrix} \frac{1}{\sqrt{2}} & \frac{1}{\sqrt{2}} & \ldots & \frac{1}{\sqrt{2}} \\ \cos\frac{\pi}{2L} & \cos\frac{3\pi}{2L} & \ldots & \cos\frac{\pi}{2L}(2L-1) \\ \vdots & \vdots & \ldots & \vdots \\ \cos\frac{\pi}{2L}(M-1) & \cos\frac{3\pi}{2L}(M-1) & \ldots & \cos\frac{\pi}{2L}(2L-1)(M-1) \end{bmatrix}$$

L indicates a quantity of maximum orthogonal bases, the quantity of maximum orthogonal bases is not greater than a quantity of the basis vectors, and M is an integer not less than 2.

In step S308, if the third method is used, the second device 102 generates each column vector in the unquantized precoding matrix B based on the received weighting coefficient and a plurality of basis vectors agreed upon with the first device 101 in advance, and then combines each generated column vector into the unquantized precoding matrix B.

Fourth Method:

In the fourth method, a method for decomposing the channel matrix H by the first device 101 to obtain the unquantized precoding matrix may be the same as that in the first method, and details are not described herein again.

In the fourth method, in step S304, when generating the channel information used to describe the unquantized precoding matrix, the first device 101 only uses phase information of each element in the unquantized precoding matrix as the channel information of the unquantized precoding matrix.

For amplitude information of each element in the generated unquantized precoding matrix, the first device 101 first quantizes the amplitude information to generate quantized amplitude information.

In step S305 and step S306, the first device 101 adds the phase information of each element in the generated unquantized precoding matrix to a ZC sequence, and sends the ZC sequence to the second device 102.

In addition, to enable the second device 102 to generate the precoding matrix, the first device 101 further needs to send the quantized amplitude information to the second device 102. Optionally, the amplitude information may also be added to a ZC sequence to be sent to the second device 102.

In step S307, the second device 102 obtains the phase information from the ZC sequence carrying the phase information. In addition, the second device 102 further needs to obtain the quantized amplitude information. For example, when the first device 101 adds the quantized amplitude information to a ZC sequence, and sends the quantized amplitude information to the second device 102, the second device 102 may obtain the quantized amplitude information from the ZC sequence.

In step S308, the second device 102 generates the precoding matrix based on the phase information of each element in the unquantized precoding matrix and the quantized amplitude information of each element in the unquantized precoding matrix.

It is assumed that the unquantized precoding matrix B is:

$$B = [v_0 \ v_1 \ \ldots \ v_{N-1}] = \begin{bmatrix} a_{0,0}e^{j\varphi_{0,0}} & a_{0,1}e^{j\varphi_{0,1}} & \ldots & a_{0,N-1}e^{j\varphi_{0,N-1}} \\ a_{1,0}e^{j\varphi_{1,0}} & a_{1,1}e^{j\varphi_{1,1}} & \ldots & a_{1,N-1}e^{j\varphi_{1,N-1}} \\ \vdots & \vdots & a_{m,n}e^{j\varphi_{m,n}} & \vdots \\ a_{M-1,0}e^{j\varphi_{M-1,0}} & a_{M-1,1}e^{j\varphi_{M-1,1}} & \ldots & a_{M-1,N-1}e^{\varphi_{M-1,N-1}} \end{bmatrix}$$

In the fourth method, the amplitude information $\alpha_{m,n}$ needs to be quantized and then transmitted, and the phase information $\varphi^{m,n}$ is still transmitted based on an unquantized analog parameter.

For example, $$v = \begin{bmatrix} 0.55e^{j4.71} \\ 0.42e^{j3.72} \\ 0.56e^{j1.09} \\ 0.44e^{j0} \end{bmatrix}.$$

A precoding matrix on which amplitude quantization is performed but phase quantization is not performed is:

$$v' = \begin{bmatrix} 0.6e^{j4.71} \\ 0.4e^{j3.72} \\ 0.6e^{j1.09} \\ 0.4e^{j0} \end{bmatrix}$$

A quantity of information bits of the channel information used to describe the unquantized precoding matrix can be effectively reduced by using the fourth method. Although a quantization error exists, the second device 102 can still obtain a relatively precise precoding matrix by properly setting a quantizing interval.

FIG. 7 shows a procedure of a second channel information reporting solution according to an embodiment of the present invention. As shown in FIG. 7, the procedure includes the following steps.

S701: A second device 102 sends a reference signal to a first device 101, where the reference signal is used to perform channel estimation on a channel from the second device 102 to the first device 101.

Optionally, when the second device 102 is a base station in an LTE system and the first device 101 is user equipment in the LTE system, the reference signal may be a DMRS.

S702: The first device 101 performs channel estimation based on the reference signal to obtain a channel matrix H.

S703: The first device 101 generates channel information used to describe the channel matrix H.

S704: The first device 101 adds the generated channel information to a ZC sequence.

S705: The first device 101 sends the ZC sequence carrying the channel information to the second device 102.

The ZC sequence is merely an example. The channel information may also be carried in another sequence for sending, provided that the second device 102 can obtain the channel information.

A manner of adding the channel information to a sequence such as the ZC sequence is actually a sending manner on a physical layer. Actually, the channel information may also be transmitted by using Media Access Control (Medium Access Control, MAC) signaling or higher layer signaling, for example, Radio Resource Control (Radio Resource Control, RRC) signaling.

S706: The second device 102 obtains the channel information from the received ZC sequence carrying the channel information.

S707: The second device 102 generates the channel matrix H based on the obtained channel information, generates an unquantized precoding matrix based on the generated channel matrix H, and determines, based on the generated unquantized precoding matrix, a sending manner used when sending data to the first device 101. For a method for determining a data sending manner by the second device 102 based on the generated unquantized precoding matrix, refer to a current method for determining a data sending manner by a base station based on a quantized precoding matrix, but in this embodiment of the present invention, the unquantized precoding matrix having higher precision is based upon.

S708: The second device 102 sends the data to the first device 101 by using the determined sending manner.

In the procedure shown in FIG. 7, the second device 102 sends the channel information used to describe the channel matrix H. Therefore, a quantization error when a quantized precoding matrix is sent is avoided, so that the channel information obtained by the first device 101 is more accurate, thereby effectively improving adaptive performance of a link.

A generation method for and a sending manner of the channel information used to describe the channel matrix H in the procedure shown in FIG. 7 are described below in detail.

In step S703, the first device 101 uses a weighting coefficient used when each column vector in the channel matrix H is represented as a weighted sum, as the channel information used to describe the channel matrix H.

The first device 101 and the second device 102 need to agree upon each used basis vector in advance, for example, agree upon in advance that P basis vectors $[U_0\ U_1\ \ldots\ U_{P-1}]$ are used. P is a positive integer. The first device 101 may represent each column vector in the obtained channel matrix H as a weighted sum of the P basis vectors:

$$\chi_0 \times U_0 + \chi_1 \times U_1 + \ldots + \chi_{P-1} \times U_{P-1}$$

A quantity of columns of the channel matrix H is C. In this way, the channel information used to describe the channel matrix H includes C*P weighting coefficients.

The C*P weighting coefficients may also be modulated to a ZC sequence by using the method provided in the first method in the procedure shown in FIG. 3. The first device 101 may also obtain the C*P weighting coefficients from the ZC sequence by using the manner provided in the method.

Optionally, P basis vectors used when a discrete Fourier transform (Discrete Fourier Transform, DFT) linear combination manner is used may be indicated by using the following formula, and M is a quantity of rows of the matrix H:

$$DFT = [U_0\ U_1\ \ldots\ U_{P-1}] = \begin{bmatrix} 1 & 1 & \ldots & 1 \\ 1 & e^{-j\frac{2\pi}{P}} & \ldots & e^{-j\frac{2\pi}{P}(P-1)} \\ \vdots & \vdots & \ldots & \vdots \\ 1 & e^{-j\frac{2\pi}{P}(M-1)} & \ldots & e^{-j\frac{2\pi}{P}(M-1)(P-1)} \end{bmatrix}$$

P basis vectors used when a discrete cosine transform (Discrete Cosine Transform, DFT) linear combination manner is used may be indicated by using the following formula, and M is a quantity of rows of the channel matrix H, that is, a quantity of transmit ports of the first device 101:

$$DFT = [U_0\ U_1\ \ldots\ U_{P-1}] =$$

$$\sqrt{\frac{2}{P}} \begin{bmatrix} \frac{1}{\sqrt{2}} & \frac{1}{\sqrt{2}} & \ldots & \frac{1}{\sqrt{2}} \\ \cos\frac{\pi}{2P} & \cos\frac{3\pi}{2P} & \ldots & \cos\frac{\pi}{2P}(2P-1) \\ \vdots & \vdots & \ldots & \vdots \\ \cos\frac{\pi}{2P}(M-1) & \cos\frac{3\pi}{2P}(M-1) & \ldots & \cos\frac{\pi}{2P}(2P-1)(M-1) \end{bmatrix}$$

P indicates a quantity of maximum orthogonal bases, and the quantity of maximum orthogonal bases is not greater than a quantity of the basis vectors.

In step S707, after receiving the channel information, the second device 102 may generate the channel matrix by using a manner reverse to that in steps S702 and S703. For example, the second device 102 generates each column vector in the channel matrix based on the received channel information and a basis vector that the second device 102 and the first device 101 agree upon, in advance, to use, and then combine each column vector into the channel matrix H.

In the procedure shown in FIG. 3 and FIG. 7, when sending the channel information to the second device 102, the first device 101 may further synchronously send a quantized CQI and/or a quantized RI.

Figure 8:
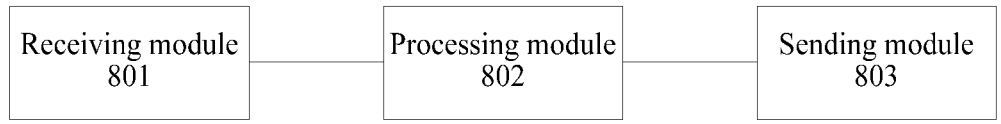
FIG. 8 is a schematic structural diagram of a first type of first device according to an embodiment of the present invention.

FIG. 8 is a schematic structural diagram of a first type of first device according to an embodiment of the present invention. As shown in the figure, the device includes:

a receiving module 801, configured to receive a reference signal from a second device;

a processing module 802, configured to: perform channel estimation based on the reference signal to obtain a channel matrix; decompose the channel matrix to obtain an unquantized precoding matrix; and generate channel information used to describe the unquantized precoding matrix; and a sending module 803, configured to send the channel information used to describe the unquantized precoding matrix to the second device.

Optionally, the processing module 802 is specifically configured to:

perform singular value decomposition SVD on the channel matrix, to obtain, after the decomposition, a diagonal matrix and a matrix including an eigenvector of the channel matrix;

determine a rank of the channel matrix based on the diagonal matrix; and transform, based on the rank of the downlink channel matrix, the matrix including the eigenvector of the channel matrix to obtain the unquantized precoding matrix.

A quantity of columns of the unquantized precoding matrix is equal to the rank of the channel matrix.

Optionally, the processing module 802 is specifically configured to:

use amplitude information and phase information of each element in the unquantized precoding matrix as the channel information used to describe the unquantized precoding matrix.

Optionally, the sending module 803 is specifically configured to:

add each of the amplitude information and the phase information of each element in the unquantized precoding matrix to a ZC sequence, and send the ZC sequence to the second device.

Optionally, the sending module 803 is specifically configured to:

alternately add the amplitude information and the phase information in the amplitude information and the phase information of each element in the unquantized precoding matrix to ZC sequences, and send the ZC sequences to the second device; or first add the amplitude information of each element in the unquantized precoding matrix to a ZC sequence and send the ZC sequence to the second device, and then add the phase information of each element to a ZC sequence and subsequently send the ZC sequence to the second device; or first add the phase information of each element in the unquantized precoding matrix to a ZC sequence and send the ZC sequence to the second device, and then add the amplitude information of each element to a ZC sequence and subsequently send the ZC sequence to the second device.

Optionally, the sending module 803 is specifically configured to:

perform code division on amplitude information of a plurality of elements in the unquantized precoding matrix, add the amplitude information to ZC sequences, and send the ZC sequences to the second device.

Optionally, the processing module 802 is specifically configured to:

use the phase information of each element in the unquantized precoding matrix as the channel information used to describe the unquantized precoding matrix.

Optionally, the processing module 802 is further configured to quantize amplitude information of each element in the unquantized precoding matrix to generate quantized amplitude information.

The sending module 803 is further configured to send the quantized amplitude information of each element in the unquantized precoding matrix to the second device.

Optionally, the processing module 802 is specifically configured to:

represent each column vector in the unquantized precoding matrix as a weighted sum of a plurality of basis vectors; and use a weighting coefficient used when each column vector in the unquantized precoding matrix is represented as a weighted sum, as the channel information used to describe the unquantized precoding matrix.

Optionally, the sending module 803 is specifically configured to:

add, to a ZC sequence, the weighting coefficient used when each column vector in the unquantized precoding matrix is represented as a weighted sum, and send the ZC sequence to the second device.

Optionally, the processing module 802 is specifically configured to:

represent the unquantized precoding matrix as a plurality of multiplied decomposed matrices by using a Givens decomposition manner, where an amplitude value of each element in each decomposed matrix is 1; and use phase information of each element in each of the plurality of decomposed matrices as the channel information used to describe the unquantized precoding matrix.

Optionally, the sending module 803 is specifically configured to:

add the phase information of each element in each of the plurality of decomposed matrices to a ZC sequence, and send the ZC sequence to the second device.

Optionally, the sending module 803 is further configured to:

send, on the first orthogonal frequency division multiplexing OFDM symbol in each timeslot on a physical resource block pair PRB pair occupied when the channel information used to describe the unquantized precoding matrix is sent, a demodulation reference signal used to demodulate the channel information that is sent on the PRB pair and that is used to describe the unquantized precoding matrix; or send, on the fourth OFDM symbol in each timeslot on a PRB pair occupied when the channel information used to describe the unquantized precoding matrix is sent, a demodulation reference signal used to demodulate the channel information that is sent in the timeslot and that is used to describe the unquantized precoding matrix; or send, on the second OFDM symbol and the sixth OFDM symbol in each timeslot on a PRB pair occupied when the channel information used to describe the unquantized precoding matrix is sent, a demodulation reference signal used to demodulate the channel information that is sent in the timeslot and that is used to describe the unquantized precoding matrix.

Optionally, the sending module 803 is specifically configured to:

send the channel information used to describe the unquantized precoding matrix together with a quantized channel quality indicator CQI and/or a quantized rank indicator RI to the second device in a same channel state indication CSI process.

For another optional implementation of the first device, refer to the implementation of the first device 101 in the procedure shown in FIG. 3. The receiving module 801 is configured to implement a receiving operation of the first device 101, for example, receive the reference signal and data that are sent by the second device 102. The processing module 802 is configured to implement a processing operation of the first device 101, for example, generate the channel matrix, generate the unquantized precoding matrix, and generate the channel information used to describe the unquantized precoding matrix. The sending module 803 is configured to implement a sending operation of the first device 101, for example, send the channel information.

Figure 9:
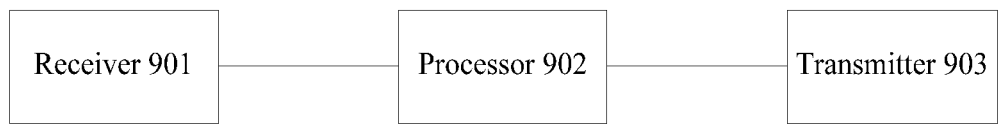
FIG. 9 is a schematic structural diagram of a second type of first device according to an embodiment of the present invention.

FIG. 9 is a schematic structural diagram of a second type of first device according to an embodiment of the present invention. As shown in the figure, the device includes:

a receiver 901, configured to receive a reference signal from a second device;

a processor 902, configured to: perform channel estimation based on the reference signal to obtain a channel matrix; decompose the channel matrix to obtain an unquantized precoding matrix; and generate channel information used to describe the unquantized precoding matrix; and a transmitter 903, configured to send the channel information used to describe the unquantized precoding matrix to the second device.

For an implementation of the receiver 901, refer to the receiving module 801. For an implementation of the processor 902, refer to the processing module 802. For an implementation of the transmitter 903, refer to the sending module 803. For another optional implementation of the device, refer to the implementation of the first device 101 in the procedure shown in FIG. 3.

Figure 10:
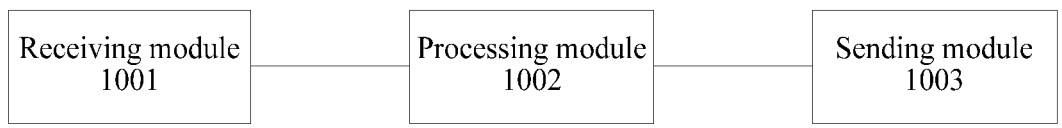
FIG. 10 is a schematic structural diagram of a first type of second device according to an embodiment of the present invention.

FIG. 10 is a schematic structural diagram of a first type of second device according to an embodiment of the present invention. As shown in the figure, the device includes:

a sending module 1003, configured to send a reference signal to a first device;

a receiving module 1001, configured to receive channel information used to describe an unquantized precoding matrix from the first device, where the unquantized precoding matrix is a matrix obtained after a channel matrix that is obtained through channel estimation performed based on the reference signal is decomposed; and a processing module 1002, configured to: generate a precoding matrix based on the channel information used to describe the unquantized precoding matrix, and send data to the first device based on the generated precoding matrix.

Optionally, the unquantized precoding matrix is a matrix obtained after singular value decomposition SVD is performed on the channel matrix.

The channel information used to describe the unquantized precoding matrix includes amplitude information and phase information of each element in the unquantized precoding matrix.

The processing module 1002 is specifically configured to generate the unquantized precoding matrix based on the amplitude information and the phase information of each element in the unquantized precoding matrix.

Optionally, the receiving module 1001 is specifically configured to:

receive ZC sequences carrying the amplitude information and the phase information of each element in the unquantized precoding matrix from the first device; and obtain the amplitude information and the phase information of each element in the unquantized precoding matrix that are carried in the ZC sequences.

Optionally, the receiving module 1001 is specifically configured to:

receive the amplitude information and the phase information of each element in the unquantized precoding matrix that are alternately carried in the ZC sequences; or first receive the amplitude information that is of each element in the unquantized precoding matrix and that is carried in a ZC sequence, and then receive the phase information that is of each element in the unquantized precoding matrix and that is carried in a ZC sequence; or first receive the phase information that is of each element in the unquantized precoding matrix and that is carried in a ZC sequence, and then receive the amplitude information that is of each element in the unquantized precoding matrix and that is carried in a ZC sequence.

Optionally, the receiving module 1001 is specifically configured to:

receive amplitude information that is of a plurality of elements in the unquantized precoding matrix and that is carried in ZC sequences after code division is performed.

Optionally, the unquantized precoding matrix is a matrix obtained after SVD is performed on the channel matrix.

The channel information used to describe the unquantized precoding matrix includes phase information of each element in the unquantized precoding matrix.

The receiving module 1001 is further configured to: before the processing module 1002 generates the precoding matrix based on the channel information used to describe the unquantized precoding matrix, receive quantized amplitude information of each element in the unquantized precoding matrix from the first device.

The processing module 1002 of the second device is specifically configured to generate the precoding matrix based on the phase information of each element in the unquantized precoding matrix and the quantized amplitude information of each element in the unquantized precoding matrix.

Optionally, the channel information of the unquantized precoding matrix includes a weighting coefficient used when each column vector in the unquantized precoding matrix is represented as a weighted sum of a plurality of basis vectors.

The processing module 1002 is specifically configured to:

generate each column vector in the unquantized precoding matrix based on the weighting coefficient; and generate the unquantized precoding matrix based on each generated column vector in the unquantized precoding matrix.

Optionally, the receiving module 1001 is specifically configured to:

receive a ZC sequence carrying the weighting coefficient from the first device; and obtain the weighting coefficient carried in the ZC sequence.

Optionally, the unquantized precoding matrix is a matrix obtained after SVD is performed on the channel matrix.

The channel information used to describe the unquantized precoding matrix includes:

phase information of each element in each of a plurality of multiplied decomposed matrices representing the unquantized precoding matrix by using a Givens decomposition manner, where an amplitude value of each element in each decomposed matrix is 1.

The processing module 1002 is specifically configured to:

generate the plurality of decomposed matrices based on the phase information of each element in each of the plurality of decomposed matrices; and multiply the generated plurality of decomposed matrices to obtain the unquantized precoding matrix.

Optionally, the receiving module 1001 is specifically configured to:

receive a ZC sequence carrying the phase information of each element in each of the plurality of decomposed matrices from the first device; and obtain the phase information that is of each element in each of the plurality of decomposed matrices and that is carried in the ZC sequence.

Optionally, the receiving module 1001 is further configured to:

receive, on the first orthogonal frequency division multiplexing OFDM symbol in each timeslot on a physical resource block pair PRB pair occupied when the channel information used to describe the unquantized precoding matrix is received, a demodulation reference signal used to demodulate the channel information that is sent on the PRB pair and that is used to describe the unquantized precoding matrix; or receive, on the fourth OFDM symbol in each timeslot on a PRB pair occupied when the channel information used to describe the unquantized precoding matrix is received, a demodulation reference signal used to demodulate the channel information that is sent in the timeslot and that is used to describe the unquantized precoding matrix; or receive, on the second OFDM symbol and the sixth OFDM symbol in each timeslot on a PRB pair occupied when the channel information used to describe the unquantized precoding matrix is received, a demodulation reference signal used to demodulate the channel information that is sent in the timeslot and that is used to describe the unquantized precoding matrix.

Optionally, the receiving module 1001 is specifically configured to:

receive a quantized channel quality indicator CQI and/or a quantized rank indicator RI that is sent in a same channel state indication CSI process together with the channel information used to describe the unquantized precoding matrix.

For another optional implementation of the second device, refer to the implementation of the second device 102 in the procedure shown in FIG. 3. The receiving module 1001 is configured to implement a receiving operation of the second device 102, for example, receive the channel information sent by the first device 101. The processing module 1002 is configured to implement a processing operation of the second device 102, for example, generate the precoding matrix, and determine a data sending manner based on the generated precoding matrix. The sending module 1003 is configured to implement a sending operation of the second device 102, for example, send the reference signal and data.

Figure 11:
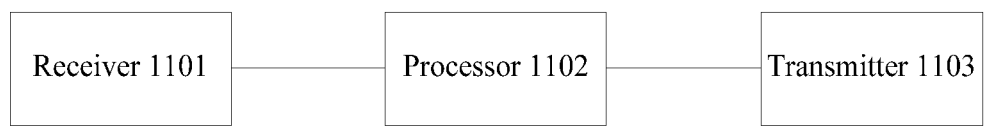
FIG. 11 is a schematic structural diagram of a second type of second device according to an embodiment of the present invention.

FIG. 11 is a schematic structural diagram of a second type of second device according to an embodiment of the present invention. As shown in the figure, the device includes:

a transmitter 1103, configured to send a reference signal to a first device;

a receiver 1101, configured to receive channel information used to describe an unquantized precoding matrix from the first device, where the unquantized precoding matrix is a matrix obtained after a channel matrix that is obtained through channel estimation performed based on the reference signal is decomposed; and a processor 1102, configured to: generate a precoding matrix based on the channel information used to describe the unquantized precoding matrix, and send data to the first device based on the generated precoding matrix.

For an implementation of the receiver 1101, refer to the receiving module 1001. For an implementation of the processor 1102, refer to the processing module 1002. For an implementation of the transmitter 1103, refer to the sending module 1003. For another optional implementation of the device, refer to the implementation of the second device 102 in the procedure shown in FIG. 3.

Figure 12:
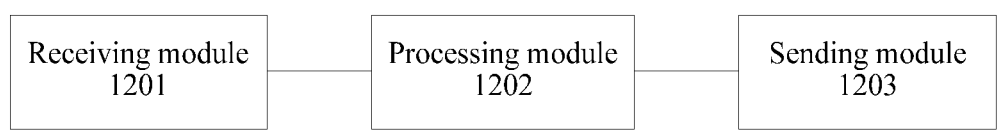
FIG. 12 is a schematic structural diagram of a third type of first device according to an embodiment of the present invention.

FIG. 12 is a schematic structural diagram of a third type of first device according to an embodiment of the present invention. As shown in the figure, the device includes:

a receiving module 1201, configured to receive a reference signal from a second device;

a processing module 1202, configured to: perform channel estimation based on the reference signal received by the receiving module 1201, to obtain a channel matrix; and generate channel information used to describe the channel matrix; and a sending module 1203, configured to send the channel information used to describe the channel matrix to the second device.

Optionally, the processing module 1202 is specifically configured to:

represent each column vector in the channel matrix as a weighted sum of a plurality of basis vectors; and use a weighting coefficient used when each column vector in the channel matrix is represented as a weighted sum, as the channel information used to describe the channel matrix.

Optionally, the sending module 1203 is specifically configured to:

add, by the first device to a ZC sequence, the weighting coefficient used when each column vector in the channel matrix is represented as a weighted sum, and send the ZC sequence to the second device.

Optionally, the sending module 1203 is specifically configured to:

send the channel information used to describe the channel matrix together with a quantized channel quality indicator CQI and/or a quantized rank indicator RI to the second device in a same channel state indication CSI process.

For another optional implementation of the first device, refer to the implementation of the first device 101 in the procedure shown in FIG. 7. The receiving module 1201 is configured to implement a receiving operation of the first device 101, for example, receive the reference signal and data that are sent by the second device 102. The processing module 1202 is configured to implement a processing operation of the first device 101, for example, generate the channel matrix and generate the channel information used to describe the channel matrix. The sending module 1203 is configured to implement a sending operation of the first device 101, for example, send the channel information.

Figure 13:
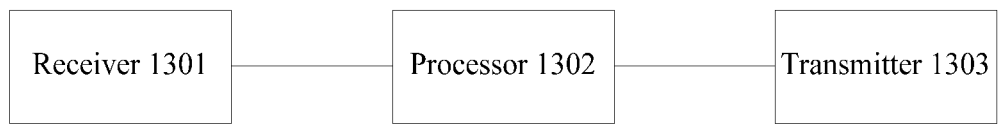
FIG. 13 is a schematic structural diagram of a fourth type of first device according to an embodiment of the present invention.

FIG. 13 is a schematic structural diagram of a fourth type of first device according to an embodiment of the present invention. As shown in the figure, the device includes:

a receiver 1301, configured to receive a reference signal from a first device;

a processor 1302, configured to: perform channel estimation based on the reference signal received by the receiver 1301, to obtain a channel matrix; and generate channel information used to describe the channel matrix; and a transmitter 1303, configured to send the channel information used to describe the channel matrix to the second device.

For an implementation of the receiver 1301, refer to the receiving module 1201. For an implementation of the processor 1302, refer to the processing module 1202. For an implementation of the transmitter 1303, refer to the sending module 1203. For another optional implementation of the device, refer to the implementation of the first device 101 in the procedure shown in FIG. 7.

Figure 14:
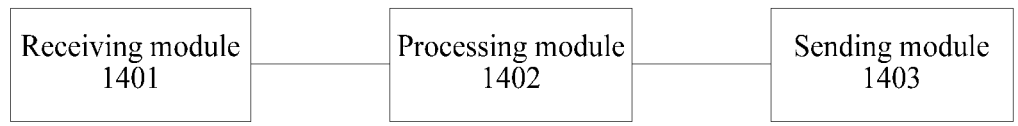
FIG. 14 is a schematic structural diagram of a third type of second device according to an embodiment of the present invention.

FIG. 14 is a schematic structural diagram of a fifth type of second device according to an embodiment of the present invention. As shown in the figure, the device includes:

a sending module 1403, configured to send a reference signal to a first device;

a receiving module 1401, configured to receive channel information used to describe a channel matrix from the first device, where the channel matrix is obtained through channel estimation performed based on the reference signal; and a processing module 1402, configured to: generate the channel matrix based on the channel information used to describe the channel matrix, and generate an unquantized precoding matrix based on the generated channel matrix.

The sending module 1403 is configured to send data to the first device based on the unquantized precoding matrix generated by the processing module 1402.

Optionally, a weighting coefficient used when each column vector in the channel matrix is represented as a weighted sum of a plurality of basis vectors is the channel information used to describe the channel matrix.

Optionally, the receiving module 1401 is specifically configured to: receive a ZC sequence carrying the weighting coefficient from the first device, and obtain the weighting coefficient carried in the ZC sequence.

Optionally, the receiving module 1401 is specifically configured to:

receive a quantized channel quality indicator CQI and/or a quantized rank indicator RI that is sent in a same channel state indication CSI process together with the channel information.

For another optional implementation of the second device, refer to the implementation of the second device 102 in the procedure shown in FIG. 7. The receiving module 1401 is configured to implement a receiving operation of the second device 102, for example, receive the channel information sent by the first device 101. The processing module 1402 is configured to implement a processing operation of the second device 102, for example, generate the channel matrix and the precoding matrix, and determine a data sending manner based on the generated precoding matrix. The sending module 1403 is configured to implement a sending operation of the second device 102, for example, send the reference signal and data.

Figure 15:
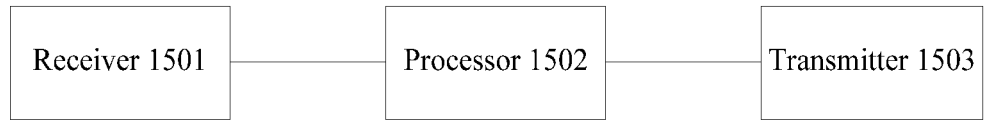
FIG. 15 is a schematic structural diagram of a forth type of second device according to an embodiment of the present invention.

FIG. 15 is a schematic structural diagram of a sixth type of second device according to an embodiment of the present invention. As shown in the figure, the device includes:

a transmitter 1503, configured to send a reference signal to a first device;

a receiver 1501, configured to receive channel information used to describe a channel matrix from the first device, where the channel matrix is obtained through channel estimation performed based on the reference signal; and a processor 1502, configured to: generate the channel matrix based on the channel information used to describe the channel matrix, and generate an unquantized precoding matrix based on the generated channel matrix.

The transmitter 1503 is configured to send data to the first device based on the unquantized precoding matrix generated by the processor 1502.

For an implementation of the receiver 1501, refer to the receiving module 1401. For an implementation of the processor 1502, refer to the processing module 1402. For an implementation of the transmitter 1503, refer to the sending module 1403. For another optional implementation of the device, refer to the implementation of the second device 102 in the procedure shown in FIG. 7.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk storage, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A first device, comprising:
a receiver, configured to receive a reference signal from a second device;
at least one processor, configured to:
perform channel estimation based on the reference signal to obtain a channel matrix, decompose the channel matrix to obtain an unquantized precoding matrix, and generate channel information describing the unquantized precoding matrix; and
a transmitter, configured to send the channel information describing the unquantized precoding matrix to the second device, wherein the decomposing the channel matrix to obtain the unquantized precoding matrix comprises:
preforming singular value decomposition (SVD) on the channel matrix, to obtain after the decomposition, a diagonal matrix and a matrix consisting of an eigenvector of the channel matrix;
determining a rank of the channel matrix based on the diagonal matrix; and
transforming, based on the rank of the channel matrix, the matrix consisting of the eigenvector of the channel matrix to obtain the unquantized precoding matrix,
a quantity of columns of the unquantized precoding matrix being equal to the rank of the channel matrix.

2. The first device according to claim 1, wherein the channel information describing the unquantized precoding matrix comprises amplitude information and phase information of each element in the unquantized precoding matrix.

3. The first device according to claim 2, wherein the at least one processor is further configured to:
add the amplitude information and the phase information of elements in the unquantized precoding matrix to ZC sequences, and
send the ZC sequences carrying the amplitude information and the phase information of the elements to the second device.

4. The first device according to claim 3, wherein the at least one processor is further configured to:
alternately add the amplitude information and the phase information of each element in the unquantized precoding matrix to the ZC sequences, and send the ZC sequences alternately carrying the amplitude information and phase information of each element to the second device; or
first add the amplitude information of the elements in the unquantized precoding matrix to a first portion of the ZC sequences and send the first portion of ZC sequences carrying the amplitude information of the elements to the second device, and then add the phase information of the elements to a second portion of the ZC sequences and send the second portion of the ZC sequences carrying the phase information of the elements to the second device; or
first add the phase information of the elements in the unquantized precoding matrix to a first part of the ZC sequences and send the first part of the ZC sequences carrying the phase information of the elements to the second device, and then add the amplitude information of the elements to a second part of the ZC sequences and send the second part of the ZC sequence carrying the amplitude information of the elements to the second device.

5. A second device, comprising:
a transmitter, configured to send a reference signal to a first device;
a receiver, configured to receive channel information describing an unquantized precoding matrix from the first device, wherein
the unquantized precoding matrix is obtained after decomposing a channel matrix that is obtained through channel estimation based on the reference signal; and
at least one processor, configured to: generate a precoding matrix based on the channel information describing the unquantized precoding matrix, and send data to the first device based on the generated precoding matrix, wherein
the unquantized precoding matrix is obtained after singular value decomposition (SVD) is performed on the channel matrix;
the channel information describing the unquantized precoding matrix comprises amplitude information and phase information of each element in the unquantized precoding matrix;
the precoding matrix is generated by the at least one processor based on the amplitude information and the phase information of each element in the unquantized precoding matrix.

6. The second device according to claim 5, wherein the receiver is further configured to:
receive ZC sequences carrying the amplitude information and the phase information of elements in the unquantized precoding matrix from the first device; and
obtain the amplitude information and the phase information of the elements in the unquantized precoding matrix that are carried in the ZC sequences.

7. The second device according to claim 6, wherein the receiver is further configured to:
receive the amplitude information and the phase information of each element in the unquantized precoding matrix that are alternately carried in the ZC sequences; or
first receive the amplitude information that is of the elements in the unquantized precoding matrix and that is carried in a first portion of the ZC sequences, and then receive the phase information that is of the elements in the unquantized precoding matrix and that is carried in a second portion of the ZC sequences; or
first receive the phase information that is of the elements in the unquantized precoding matrix and that is carried in a first part of the ZC sequences, and then receive the amplitude information that is of the elements in the unquantized precoding matrix and that is carried in a second part of the ZC sequences.

8. The second device according to claim 6, wherein the receiver is further configured to:
receive amplitude information that is of the elements in the unquantized precoding matrix and that is carried in the ZC sequences after code division is performed.

9. A channel information reporting method, comprising:
preforming, by a first device, channel estimation based on a reference signal received from a second device to obtain a channel matrix;
decomposing, by the first device, the channel matrix to obtain an unquantized precoding matrix;
generating, by the first device, channel information describing the unquantized precoding matrix; and
sending, by the first device, the channel information describing the unquantized precoding matrix to the second device, wherein
the decomposing, by the first device, the channel matrix to obtain an unquantized precoding matrix comprises:
performing, by the first device, singular value decomposition (SVD) on the channel matrix to obtain, after the decomposition, a diagonal matrix and a matrix consisting of an eigenvector of the channel matrix;
determining, by the first device, a rank of the channel matrix based on the diagonal matrix; and
transforming, by the first device based on the rank of the downlink channel matrix, the matrix consisting of the eigenvector of the channel matrix to obtain the unquantized precoding matrix, wherein a quantity of columns of the unquantized precoding matrix is equal to the rank of the channel matrix.

10. The method according to claim 9, wherein the generating, by the first device, channel information describing the unquantized precoding matrix comprises:
using, by the first device, amplitude information and phase information of each element in the unquantized precoding matrix as the channel information describing the unquantized precoding matrix.

11. The method according to claim 10, wherein the sending, by the first device, the channel information describing the unquantized precoding matrix to the second device comprises:
adding, by the first device, the amplitude information and the phase information of elements in the unquantized precoding matrix to ZC sequences, and sending the ZC sequences carrying the amplitude information and the phase information of the elements to the second device.

12. The method according to claim 11, wherein
the adding, by the first device, the amplitude information and the phase information of elements in the unquantized precoding matrix to ZC sequences, and sending the ZC sequences to the second device comprises:
alternately adding, by the first device, the amplitude information and the phase information of each element in the unquantized precoding matrix to the ZC sequences, and sending the ZC sequences alternately carrying the amplitude information and phase information of each element to the second device; or
first adding, by the first device, the amplitude information of the elements in the unquantized precoding matrix to a first portion of the ZC sequence and sending the first portion of the ZC sequence carrying the amplitude information of the elements to the second device, and then adding the phase information of the elements to a second portion of the ZC sequences and subsequently sending the second portion of the ZC sequences carrying the phase information of the elements to the second device; or
first adding, by the first device, the phase information of the elements in the unquantized precoding matrix to a first part of the ZC sequences and sending the first part of the ZC sequences carrying the phase information of the elements to the second device, and then adding the amplitude information of the elements to a second part of the ZC sequences and subsequently sending the second part of the ZC sequences carrying the amplitude information of the elements to the second device.

13. A data sending method, comprising:
sending, by a second device, a reference signal to a first device;
receiving, by the second device, channel information describing an unquantized precoding matrix from the first device, wherein
the unquantized precoding matrix is obtained by decomposing a channel matrix obtained through channel estimation based on the reference signal;
generating, by the second device, a precoding matrix based on the channel information describing the unquantized precoding matrix; and
sending, by the second device, data to the first device based on the generated precoding matrix, wherein
the unquantized precoding matrix is obtained after singular value decomposition (SVD) is performed on the channel matrix;
the channel information describing the unquantized precoding matrix comprises amplitude information and phase information of each element in the unquantized precoding matrix; and
the generating, by the second device, a precoding matrix based on the channel information describing the unquantized precoding matrix comprises: generating, by the second device, the precoding matrix based on the amplitude information and the phase information of each element in the unquantized precoding matrix.

14. The method according to claim 13, wherein the receiving, by the second device, channel information describing an unquantized precoding matrix comprises:
receiving, by the second device, ZC sequences carrying the amplitude information and the phase information of elements in the unquantized precoding matrix from the first device; and
obtaining, by the second device, the amplitude information and the phase information of the elements in the unquantized precoding matrix that are carried in the ZC sequences.

15. The method according to claim 14, wherein the receiving, by the second device, channel information describing an unquantized precoding matrix comprises:
receiving, by the second device, the amplitude information and the phase information of each element in the unquantized precoding matrix that are alternately carried in the ZC sequences; or
first receiving, by the second device, the amplitude information that is of the elements in the unquantized precoding matrix and that is carried in a first portion of the ZC sequences, and then receiving the phase information that is of the elements in the unquantized precoding matrix and that is carried in a second portion of the ZC sequences; or
first receiving, by the second device, the phase information that is of the elements in the unquantized precoding matrix and that is carried in a first part of the ZC sequences, and then receiving the amplitude information that is of the elements in the unquantized precoding matrix and that is carried in a second part of the ZC sequences.

16. The method according to claim 14, wherein the receiving, by the second device, channel information describing an unquantized precoding matrix comprises:
receiving, by the second device, amplitude information that is of the elements in the unquantized precoding matrix and that is carried in the ZC sequences after code division is performed.

* * * * *